United States Patent [19]

Lasnetski

[11] Patent Number: 5,172,952
[45] Date of Patent: Dec. 22, 1992

[54] OVERHEAD STORAGE RACK FOR STORING LADDERS OR THE LIKE

[76] Inventor: Ron Lasnetski, R.R. 1, Box 128, Lake Benton, Minn. 56149

[21] Appl. No.: 894,648

[22] Filed: Jun. 5, 1992

[51] Int. Cl.⁵ .............................................. B60R 11/06
[52] U.S. Cl. .............................. 296/37.8; 296/37.7; 182/127; 224/310; 224/311
[58] Field of Search ................... 296/37.7, 37.6, 37.8; 224/310, 311, 324, 42.46, 281; 414/462; 182/127, 88

[56] References Cited

U.S. PATENT DOCUMENTS

| | | | |
|---|---|---|---|
| 2,642,217 | 6/1953 | Jennings | 182/88 |
| 3,155,299 | 11/1964 | Horne et al. | 224/311 |
| 3,294,267 | 12/1966 | Schweigert | 224/42.46 R |
| 4,058,243 | 11/1977 | Tappan | 414/462 X |
| 4,139,078 | 2/1979 | Keller | 182/88 |
| 4,915,437 | 4/1990 | Cherry | 296/37.6 |

FOREIGN PATENT DOCUMENTS

| | | | |
|---|---|---|---|
| 679698 | 4/1930 | France | 296/37.7 |
| 2622160 | 4/1989 | France | 414/462 |

Primary Examiner—Charles A. Marmor
Assistant Examiner—Gary C. Hoge

[57] ABSTRACT

A rack for use in automotive vehicles or other storage areas for supporting a ladder or similar device hanging from an overhead support such as a ceiling. A roller track is provided for the movable support at one end of the ladder, and a sling supports the opposite end.

11 Claims, 3 Drawing Sheets

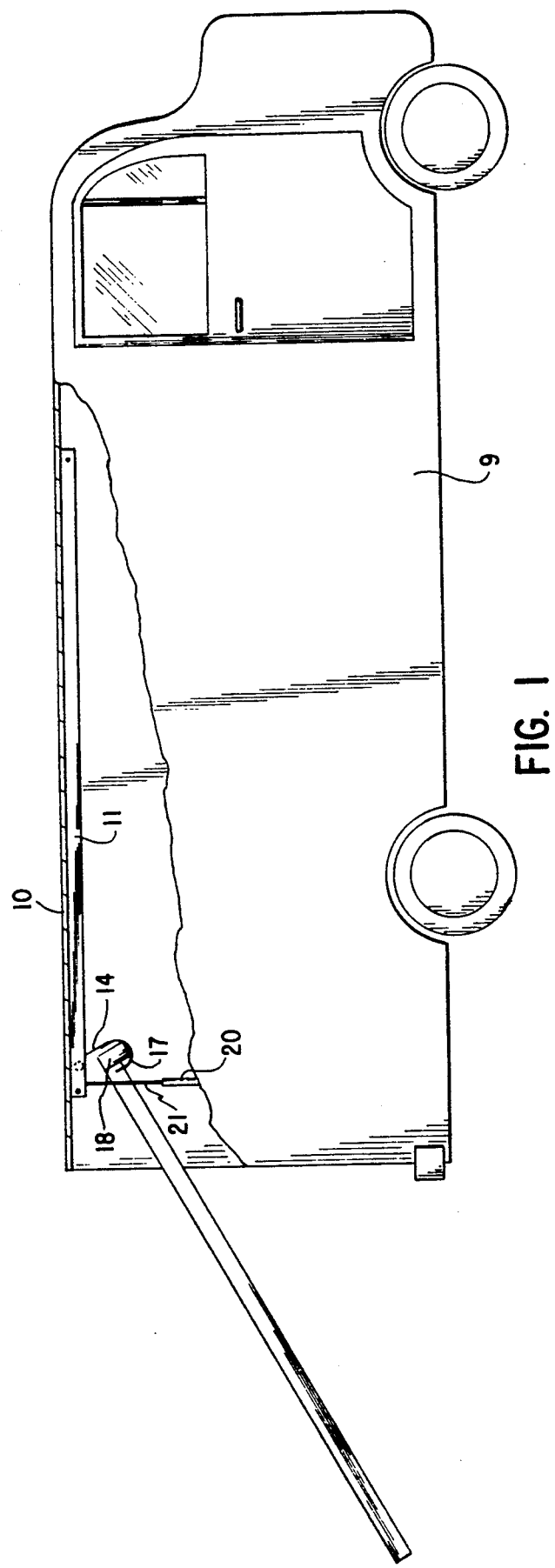

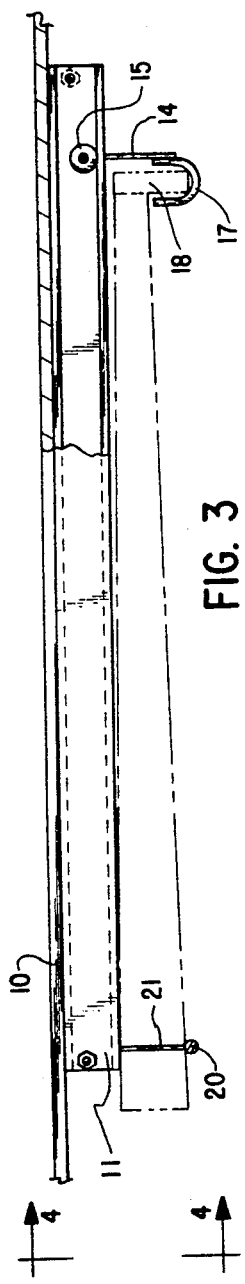
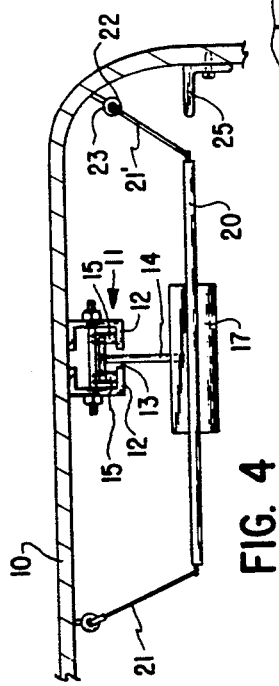
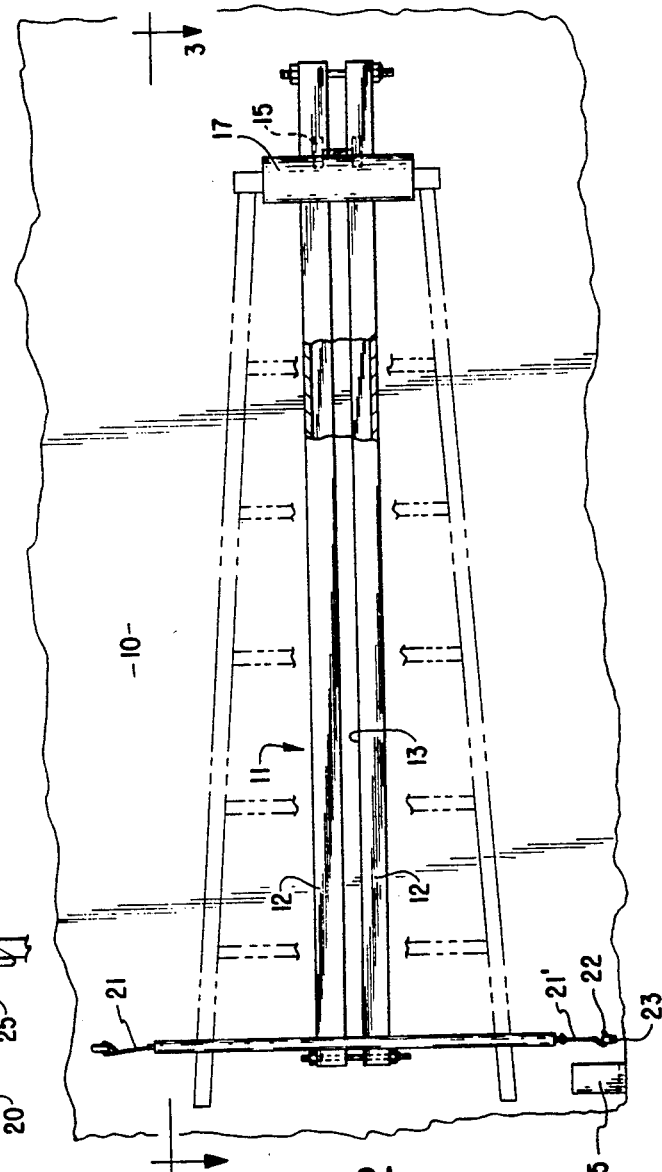

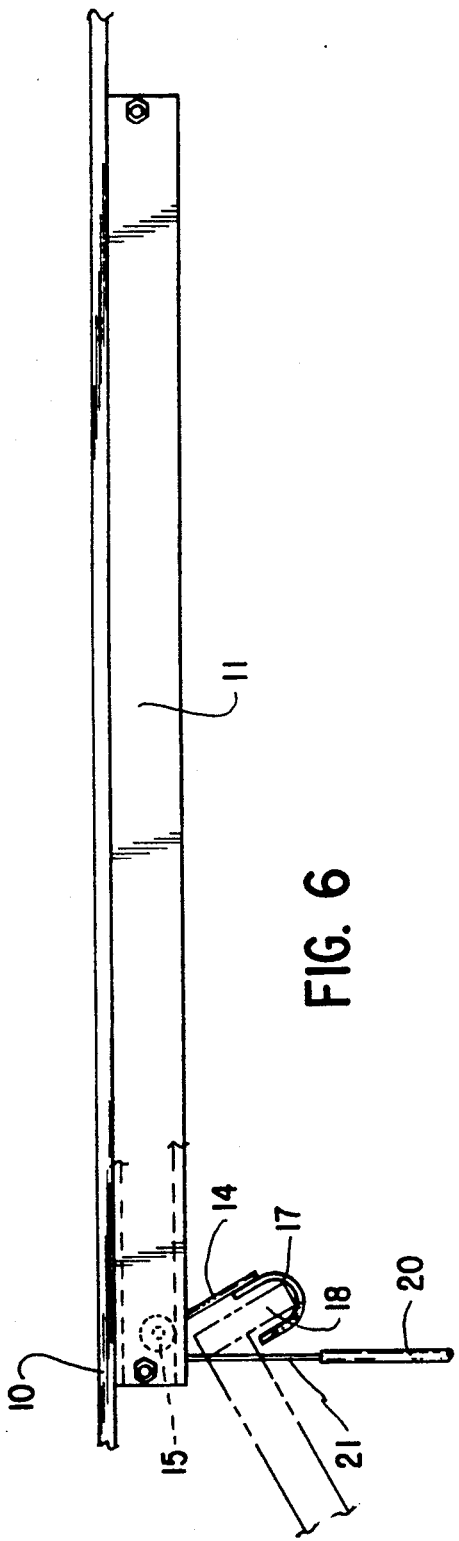
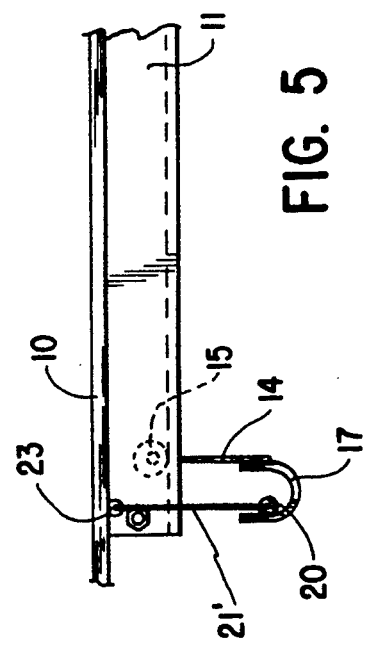
FIG. 6
FIG. 5

OVERHEAD STORAGE RACK FOR STORING LADDERS OR THE LIKE

BACKGROUND AND SUMMARY OF THE INVENTION

This invention pertains to carrying devices adapted for the storage of auxiliary tools or the like to be transported in automotive vans or other conveyance, and more particularly to a ceiling rack in such a conveyance for the easy handling of such extended tools or ladders.

In many service occupations, notably electricians, plumbers, and TV and telephone repair services, an automotive van is a convenient transport for supplies and tools. Because a van is enclosed, the tools may be protected without the need for separate tool boxes or covers. However, there is a limited amount of floor space on which boxes of supplies, equipment, tools and the like can be placed. Therefore, such elongated tools as ladders frequently are a hindrance to any sort of organization of other tools and materials.

By the present invention, the ladder can be suspended from the ceiling of the van. By using a hook device on a roller mounted on a track to hold one end, the ladder can be easily loaded and unloaded and the ladder will be safely held for travel. Although described in connection with a van, the device is readily adaptable to use with a pickup topper or in a building.

BRIEF DESCRIPTION OF THE DRAWINGS

FIG. 1 is an elevational view of a van partly broken away to show the rack in place, FIG. 2 is a plan view looking upward at the ceiling of the conveyance, FIG. 3 is a view from line 3—3 of FIG. 2.

FIG. 4 is a view from line 4—4 of FIG. 3,

FIG. 5 is a side elevational view of the carrier showing the holders without a load, and FIG. 6 is a view similar to FIG. 4 showing a ladder being loaded.

DESCRIPTION

Briefly this invention comprises a hanging device to suspend a ladder or similar tool from the roof of a van or the like. The device includes a hook suspended from a rail to support one end of the suspended tool and a hanger to support the other end. More specifically and referring to the drawings, the storage rack is adapted to be permanently attached to the top 10 of a van 9, pickup topper or to a support in a building for storage.

The rack includes a track 11 composed of two channel members 12 extending in a longitudinal direction and fastened to the top 10 by an convenient means. The channels are spaced apart to form a groove 13 through which a hanger 14 may run. This hanger is suspended from rollers 15 which are positioned to roll within the channel members 12. The track 11 extends from the normal opening in the rear of the van towards the front and terminates near the usual partition between the passenger compartment and the load carrying compartment. Thus, the track 11 runs from the door in the back of the van longitudinally toward the front.

The hanger 14 and its rollers 15 carry a laterally extending hook 17. This hook is formed to cradle the top step 18 of a stepladder as shown in the figures. Thus, a ladder or similar device could be hung on the hook 17 when the carrier including the hanger 14 and its rollers 15 is at the end of the track near the open rear, then simply by pushing the ladder, the carrier can be moved to the front of the van. In this way, the one end of the ladder can be easily loaded and carried to a position near the ceiling adjacent the front end of the cargo compartment of the van.

To support the other end of the ladder, a hanging yoke may be provided. This yoke may consist of a rod or preferably a covered bar 20 suspended from the ceiling 10 by wires 21 and 21' or other suitable, flexible cords. The bar 20 is spaced from the ceiling enough so that the ladder or other device being carried can easily slide between the ceiling and the bar. At least one of the wires 21' is formed with a hooked end 22 adapted to be hooked in an eye 23 on the ceiling of the enclosure.

As the ladder is being loaded, it may be placed within the yoke formed by the bar 20 and its suspending wires 21, and with the top step 18 or rung placed in the hook 17. By pushing the ladder toward the front of the van, the top step moves the carrier including the hanger toward the front of the cargo compartment. When the lower end of the ladder nears the bar 20, the loading can be stopped so that one end is supported by the hook 17 and the other end by the bar 20. The ladder is thus stored well above the floor in a convenient position and can be easily loaded and unloaded. Alternatively, the wire 21' may be unhooked either at the beginning of the unloading or at any time during the process. This may be especially useful where the ceiling is high compared to the stature of the person unloading the ladder because the ladder will drop when wire is unhooked. In the situation where the wire 21' is unhooked for loading or unloading, a rest ledge 25 can be provided. The ladder can then rest on this ledge while the wire 21', is grasped and swung into place for holding.

The hook 17 is maintained in a transverse position, approximately perpendicular to the track 11 by simple engagement with the rung of the ladder while loading or during transport of a ladder. When the device is empty, the hook 17 shall be engaged with the bar 20 as shown in FIG. 5. Again the transverse position is maintained, and the hook 17 is in good position for loading.

Thus a convenient and efficient device is constructed for transport of a ladder in a van or similar conveyance.

I claim:

1. In combination with an automotive vehicle having a cargo compartment with a ceiling, storing means for a ladder comprising a track attached to said ceiling, carrier means movably mounted on said track for travel longitudinally thereof, said carrier means being formed to engage one end of said ladder, yoke means attached to said ceiling, said yoke means adapted to surround said ladder and thereby to suspend it from said ceiling, said carrier means being movable on said track away from said yoke means whereby said one end of said ladder can be moved to a position remote from said yoke means, said yoke means then being positioned to support the end of said ladder opposite said first-named end.

2. The combination of claim 1 on which said track includes channel shaped members having flanges and being spaced apart to form a slot within which said carrier means moves.

3. The combination of claim 2 in which said carrier means includes rollers adapted to roll on said flanges to provide for said longitudinal travel.

4. The combination of claim 3 in which said carrier means also includes a laterally extending hook suspended from said rollers, said hook being adapted to receive and support one end of said ladder.

5. The combination of claim 1 in which said yoke includes a covered bar adapted to engage said ladder and to support said ladder in suspension from said ceiling.

6. The combination of claim 5 in which at least one hanging means extends between said ceiling and said bar to support said bar.

7. The combination of claim 6 in which at least one of said at least one hanging means is releasably attached to said ceiling whereby said yoke means may be dropped from said ceiling.

8. A storing means for storing a ladder from an overhead support comprising a longitudinal track fixed to said overhead support, carrier means for a first end of said ladder including rollers adapted to roll on said track, said carrier means also including a hook adapted to support said first end, yoke means also fixed to said overhead support, said yoke means being located at a loading end of said track, said carrier means being movable on said track from said loading end to a position remote from said loading end thus carrying said first end to said remote position, said yoke means being then adapted to support a second end of said ladder.

9. The storing means of claim 8 in which at least one hanging means extends between said overhead support and said bar to support said bar.

10. The storing means of claim 9 in which at least one of said at least one hanging means is releasably attached to said overhead support whereby said yoke means may be dropped from said overhead support.

11. The storing means of claim 10 in which a wall extends downwardly from and adjacent to said overhead support, rest means on said wall adjacent said hanging means whereby said ladder can be supported by said rest means when said yoke means is released from its attachment.

* * * * *